(12) United States Patent
Nandi

(10) Patent No.: US 9,137,573 B2
(45) Date of Patent: Sep. 15, 2015

(54) SYSTEMS AND METHODS FOR MANAGING MEDIA CONTENT BASED ON SEGMENT-BASED ASSIGNMENT OF CONTENT RATINGS

(75) Inventor: Satish Nandi, San Jose, CA (US)

(73) Assignee: NETGEAR, Inc., San Jose, CA (US)

( * ) Notice: Subject to any disclaimer, the term of this patent is extended or adjusted under 35 U.S.C. 154(b) by 102 days.

(21) Appl. No.: 13/154,192

(22) Filed: Jun. 6, 2011

(65) Prior Publication Data

US 2012/0311625 A1 Dec. 6, 2012

(51) Int. Cl.
| | |
|---|---|
| H04N 21/475 | (2011.01) |
| H04N 21/845 | (2011.01) |
| H04N 21/454 | (2011.01) |
| H04N 21/234 | (2011.01) |
| H04N 21/2662 | (2011.01) |
| H04N 21/4402 | (2011.01) |
| H04N 21/45 | (2011.01) |
| H04N 21/4545 | (2011.01) |

(52) U.S. Cl.
CPC ..... *H04N 21/4542* (2013.01); *H04N 21/23418* (2013.01); *H04N 21/2662* (2013.01); *H04N 21/44029* (2013.01); *H04N 21/4532* (2013.01); *H04N 21/45457* (2013.01); *H04N 21/4755* (2013.01); *H04N 21/4756* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 2002/0147782 | A1* | 10/2002 | Dimitrova et al. | 709/207 |
| 2005/0066357 | A1* | 3/2005 | Ryal | 725/35 |
| 2006/0130118 | A1* | 6/2006 | Damm | 725/135 |
| 2007/0204288 | A1* | 8/2007 | Candelore | 725/28 |
| 2011/0283311 | A1* | 11/2011 | Luong | 725/28 |
| 2011/0321080 | A1* | 12/2011 | Durden et al. | 725/28 |

FOREIGN PATENT DOCUMENTS

| | | |
|---|---|---|
| EP | 1376583 A2 | 1/2004 |
| WO | WO-02/089473 A1 | 11/2002 |
| WO | WO-/02/089482 A1 | 11/2002 |
| WO | WO-/03/024106 A1 | 3/2003 |
| WO | WO-/2005/001715 A1 | 1/2005 |

OTHER PUBLICATIONS

Extended European Search Report issued for Patent Application No. 12170058.7, dated Nov. 7, 2012, 8 pages.

* cited by examiner

*Primary Examiner* — Nathan Flynn
*Assistant Examiner* — Omar S Parra
(74) *Attorney, Agent, or Firm* — Norton Rose Fulbright US LLP

(57) ABSTRACT

Embodiments of the present invention relate generally to media content, such as content contained within audio works (e.g., songs, audio-books, etc.), audiovisual works (e.g., movies, films, etc.), and textual works, as examples, as well as managing playback of such content, and more specifically to assigning independent content ratings to various segments of an individual work (as opposed to or in addition to a content rating for the individual work as a whole) and managing playback of such work based at least in part on the assigned ratings of the various segments.

24 Claims, 7 Drawing Sheets

SYSTEMS AND METHODS FOR MANAGING MEDIA CONTENT BASED ON SEGMENT-BASED ASSIGNMENT OF CONTENT RATINGS

CROSS-REFERENCE TO RELATED APPLICATIONS

N/A.

TECHNICAL FIELD

The following description relates generally to media content, such as content contained within audio works (e.g., songs, audio-books, etc.), audiovisual works (e.g., movies, films, etc.), and textual works, as examples, as well as managing playback of such content, and more specifically to assigning independent content ratings to various segments of an individual work (as opposed to or in addition to a content rating for the individual work as a whole) and managing playback of such work based at least in part on the assigned independent ratings of the various segments.

BACKGROUND

Content ratings are often provided for artistic works of authorship, like movies, songs, books, etc. to inform consumers of the nature and/or appropriateness of the content for certain audiences. As one example, a motion picture rating system is designated to classify films with regard to suitability for audiences in terms of issues such as sex, violence, substance abuse, profanity, impudence or other types of mature content that may be contained within a given motion picture (or "movie"). The rating system is designed to help consumers make more educated decisions about whether a given movie is suitable for a particular audience, such as themselves, their children, etc. A lower (or "less restrictive") rating may be afforded to a work that is deemed suitable for viewing by broader audiences, including young children, etc., whereas a higher (or "more restrictive") rating may be afforded to a work that is deemed to have a more restrictive audience for which it is suitable (such as only suitable for children above a certain age, etc.).

In some countries, such as Australia, an official government body decides on ratings; while in other countries, such as the United States, it is generally done by industry committees with little, if any, official government involvement. The influence of specific factors in deciding a rating varies from country to country. For example, in certain countries, like the U.S., movies with strong sexual content are often restricted to adult viewers, whereas in other countries, like France and Germany, sexual content is viewed much more leniently. On the other hand, movies with violent content are often subject in some countries, like Germany and Finland, to high/restrictive ratings, whereas other countries may offer more lenient ratings to violent movies. Other factors may or may not influence the classification process, such as whether the movie is set within a non-fictional historical context, whether the movie glorifies violence or drug use, whether violence or drug use is carried out by the protagonist with whom the viewer should empathize or by the antagonist, etc.

A movie may be produced with a particular rating in mind, and it may be re-edited in some instances if the desired rating is not obtained, especially to avoid a higher rating than intended. A movie may also be re-edited to produce an alternate version, such as for distribution in other countries, broadcast on television networks, etc.

The Motion Picture Association of America's (MPAA's) film-rating system is often used in the U.S. and its territories to rate a film's thematic and content suitability for certain audiences. In the U.S., the MPAA's rating systems are generally the most-recognized guide for parents regarding the content of movies. Since 1990, MPAA movie ratings are: G—General Audiences (all ages admitted), PG—Parental Guidance Suggested (some material may not be suitable for children), PG-13—Parents Strongly Cautioned (some material may not be appropriate for children under 13), R—Restricted (under 17 requires accompanying parent or adult guardian), and NC-17 (no one 17 and under admitted).

Similarly, content ratings are often provided for works other than movies. For instance, song recordings are often designated as "explicit" if they contain explicit lyrics. Content ratings are also provided for books in some cases. For instance, the Marvel Rating System is a system for rating the content of comic books, with regard to appropriateness for different age groups. The Marvel Rating System assigns each comic book one of the following ratings: ALL AGES—appropriate for all ages; A—appropriate for age 9 and up; T+ TEENS AND UP—appropriate for most readers 13 and up, parents are advised that they might want to read before or with younger children; PARENTAL ADVISORY—15 years and older—similar to T+ but featuring more mature themes and/or more graphic imagery; and MAX: EXPLICIT CONTENT—appropriate for persons 18 years or older.

Traditionally, a rating is assigned for an individual work, such as for a given movie, song, book, etc. Individual works may be arranged into a compilation, such as an album containing a plurality of individual song recordings thereon. Each individual work within such a compilation traditionally has a respective rating (e.g., certain songs on an album may be rated "explicit" while others are rated "clean"), and in some instances the overall compilation (e.g., album) may have a rating.

In many cases, a high/restrictive (e.g., explicit) rating is assigned to an individual work because of a relatively small portion of the content contained therein (e.g., a few scenes of a movie or a few lyrics in a song). So, essentially the rating assigned to the individual work is for the worst-case scenario (i.e., the worst portion of the content contained within the individual work), although such portion on which the rating is based may be a relatively small part of the total content of the individual work. Because a work having a restrictive rating may contain a relatively small portion of offensive content that lead to the restrictive rating, consumers often choose to nevertheless play a work that is rated more restrictive than the consumer may desire to play, and in some instances the consumer chooses to endure/overlook the small portion of offensive content or attempts to take manual action to avoid presentation of the offensive content (e.g., by fast forwarding through the offensive content).

Traditionally, responsibility falls on such a consumer of an individual work having a high/restrictive rating (e.g., a moving having a rating of at least "PG," "PG-13," or "R") to try to watch and/or listen for the offensive content and take manual action to fast-forward through such content if he/she does not want to have that content played for the audience (e.g., the consumer himself/herself, their children, etc.). Often, such monitoring by the consumer is difficult or impossible, as the offensive content may not be identified by the consumer until it is presented. Even when the consumer is familiar with the individual work and has knowledge about where the offending content resides therein, monitoring the individual work and taking manual action to avoid presentation of such content (e.g., through fast-forwarding through the offensive content) is an undesirable responsibility to place on the consumer, which may detract from the consumer's enjoyment of the individual work and/or media experience, in addition to being prone to human error (e.g., in the event the consumer is distracted or otherwise fails to properly take action to avoid presentation of offensive content).

In some instances, technological approaches have been employed to aid in preventing individual works having a certain rating from being presented to inappropriate audiences. For example, the V-chip technology is commonly implemented in television receivers in the U.S. and Canada, which allows the blocking of programs based on their ratings. In this way, an individual work (e.g., television program) having a rating that exceeds a certain level may be entirely blocked by the V-chip. This allows parents to effectively block programs having a high/restrictive rating from being viewed on their television by their children, for example.

Additionally, in some instances, an individual work may have two separate versions of it created, such as one "clean" version and one "explicit" version. As an example, many songs that contain explicit lyrics have an alternative "clean" version that may be selected/purchased by a consumer. For instance, the original song may be modified to create a "clean" version to make the explicit lyrics contained in the original song unintelligible or to replace the explicit lyrics with different "clean" lyrics. In this scenario, each version of the song is a stand-alone recording, which is either rated as "clean" or as "explicit." Again, each song recording is assigned a single rating for the overall content of the song, and consumers must select which song version they desire. Similarly, movies may have different versions created, such as a version that is suitable for TV broadcast, where the "cleaner" version (e.g., the TV version) may have certain scenes removed or replaced with other "cleaner" scenes and/or the audio may be modified (e.g., to dub over the original soundtrack to replace certain offensive words with "cleaner" words, etc.).

Thus, a consumer desiring to play a certain individual work (rather than having the work blocked or otherwise avoiding the work altogether) but who is conscience or desirous of avoiding certain offensive or explicit content of the work is left to either select a "clean" version of such work (if one is available) and/or to self-monitor the playback of the work and take manual effort to avoid the offensive or explicit portions of the work's content.

BRIEF SUMMARY

Embodiments of the present invention relate generally to media content, such as content contained within audio works (e.g., songs, audio-books, etc.), audiovisual works (e.g., movies, films, etc.), and textual works, as examples, as well as managing playback of such content, and more specifically to assigning independent content ratings to various segments of an individual work (as opposed to or in addition to a content rating for the individual work as a whole) and managing playback of such work based at least in part on the assigned ratings of the various segments.

As used herein, the term "work" refers generally to a work of the nature that is copyrightable under U.S. copyright law. Of course, a work need not be copyrighted for application of embodiments of the present invention, but the term "work" nevertheless generally refers to works of the type that may be copyrighted. Examples of such works include audiovisual works (e.g., movies, films, motion pictures, video recordings of live performances, etc.), audio works (e.g., song recordings, audio books, sound recordings of live performances, etc.), textual works (e.g., digital books or "e-books," digital magazines, etc.), and pictorial works (e.g., drawings, paintings, photographs, etc.). It should be noted that some individual works may contain a combination of different forms of content, such as moving picture (e.g., video) content and audio content, as in an audiovisual work (e.g., a movie); audiovisual content and textual content, as in a movie with subtitles; textual content and pictorial content (e.g., drawings, photographs, etc.), as in a book or magazine with both text and pictures, as examples.

Also, as used herein, an "individual work" refers generally to a single work, such as a single movie, song recording, digital book, etc., as opposed to a compilation of a plurality of independent works, such as an album containing a plurality of songs.

Certain embodiments of the present invention assign content ratings to each of a plurality of segments of an individual, non-programmatic work based on the content contained in the respective segment. Further, the individual non-programmatic work and an identification of the content ratings assigned to each of the plurality of segments may be stored to a data storage device. Accordingly, the work and the content ratings may be read by a content manager device to manage delivery and/or playback of the work, based at least in part on the respective content ratings of the segments. For instance, a content manager device may be configured to cause the playback to skip certain ones of the segments that have a content rating at or above a certain restrictive level. As another example, in some instances the content manager device may be configured to cause the playback to replace certain ones of the segments that have a content rating at or above a certain restrictive level with alternative segments that have a content rating below the certain restrictive level.

It should be noted that as used herein "non-programmatic" works refer generally to individual works whose content output (e.g., playback) is predefined such that it is substantially consistently presented in each playback of the work (e.g., in a consistent flow thereof), such as with the above-mentioned audiovisual works, audio works, textual works, and pictorial works, as opposed to "programmatic" works like video games where the content output varies dynamically based on interaction with a user (e.g., based on the user's actions taken in playing the game). For instance, a movie, song, or e-book is pre-authored to contain a fixed flow of its static/pre-recorded content (e.g., progression from one pre-recorded scene or frame of a movie to the next, progression from one bar of a pre-recorded song to the next, progression from one sentence of an e-book to the next, etc.). On the other hand, programmatic works like video games are generally coded to vary their output of content dynamically, from playback to playback, depending on the performance of the user in playing the game during a given playback.

With programmatic works, like video games, underlying software code is typically authored with instructions that are stored to a computer-readable medium that when read by a processor are interpreted by the processor to dynamically generate output content based on dynamic interactions with a user playing the game. Thus, such programmatic works are authored with instructions regarding the dynamically varying flow of its output content, typically including branch instructions and/or other instructions that dynamically vary the presentation of output content from one playback to the next depending on the user's skill level and success in interacting with the game during a given playback thereof. Rather than relying primarily on software instructions to cause a processor to generate a dynamically varying output of content, non-programmatic works like movies, song recordings, e-books, etc. have their content authored with a substantially static, predefined flow for the output presentation of such content from one playback to the next.

Non-programmatic works may be stored in digital form, which may be read for playback by a digital media player. The digital form of the non-programmatic work may be encoded according to some encoding process that the media player can decode for outputting the content of the work. For instance, audio works may be encoded according to MP3, audiovisual works may be encoded according to a MPEG-based encoding, and an e-book may be encoded in a given e-Reader encoding, such as plain text (.txt format), hypertext markup language (.htm or .html format), XML-based or SGML-based formats (e.g., as used for the TEI Lite electronic format), Kindle e-book reader format (.azw format), open electronic package format (.opf format), TomeRaider e-book format (.tr2 or .tr3 format), Adobe portable document format (.pdf format), PostScript format (.ps format), Microsoft Reader format (.lit format), Palm Media format (.pdb format), or .epub format, as examples.

As used herein, a "player" refers generally to any device for playback of a work. The "playback" of a work refers generally to output of the content of such work, which may be output of an audio work, an audiovisual work, a textual work, or a pictorial work, as examples. For instance, an e-book Reader may be a player that is employed for "playback" of an e-book. Such a "playback" of an e-book typically presents portions of the book one screen (e.g., one page) at a time, and responds to user input to advance to the next screen presenting the next sequential portion of the e-book. A media player (e.g., MP3, MPEG player, etc.) may be a player that is employed for "playback" of an audio work (e.g., song recording) or audiovisual work (e.g., movie), for example. Computers, set-top boxes, CD players, DVD players, receivers of various types for receiving streaming content (e.g., broadcast or otherwise), or other types of player devices may be employed for playback of a work as will be readily appreciated by those of ordinary skill in the art.

Certain embodiments of the present invention enable certain segments of a non-programmatic individual work to be skipped or replaced with other segments (e.g., depending on the content ratings assigned to the respective segments and the settings established for playback to a given audience). Thus, in some applications of an embodiment of the present invention, a content manager device may vary the playback output of the non-programmatic work from one playback to the next based on the content ratings assigned to the respective segments of content contained within the work and the preferences of the receiving audience.

In accordance with certain embodiments of the present invention, a respective content rating is assigned for each of a plurality of segments of content contained within an individual work, rather than being limited solely to an overall content rating for the work as a whole. The respective content ratings are assigned to each segment based on the content contained within the respective segment.

The segments defined for an individual work may be of equal size/length, or they may vary. For instance, in one embodiment, the segments have a fixed, predefined size, such as X number (e.g., 500) of frames of an audiovisual work. In this way, the length of the segments may be relatively fixed/static, and a respective content rating is assigned to each segment, as discussed further below. In another embodiment, segment lengths may vary based on assignment of content rating tags. For instance, a first segment having a rating of "G" may have a length stretching to a subsequent portion of the content where the rating changes from "G" (e.g., to "R"). That is, a first segment may begin with a cue or tag indicating that the segment's content has a "G" rating, and may continue to a point in the content of the work where a cue or tag indicates that the content changes from "G" to a different rating, such as "R". Such a cue or tag indicating the content ratings may be embedded within the content itself (e.g., as a tag, header, etc.) or it may reside external to the content itself but accompany the content and identify locations (e.g., running-time points or other reference points within the content) where the content ratings change. A second segment having the changed rating (e.g., "R") may then begin and stretch to a subsequent portion of the content where the rating changes again (e.g., back to "G") at which point a third segment having the new rating begins, and so on.

It should be recognized that certain embodiments of the present invention enable an independent content rating to be assigned on a per-segment basis of an individual work, as opposed to be restricted merely to a content rating for the overall individual work. Thus, identification of content ratings may be made at a finer granularity than the overall work. Accordingly, as discussed further below, an audience desiring to receive (e.g., view, listen, read, etc.) content less explicit than an individual work's overall content rating may nevertheless receive the work having the more explicit than desired rating, and a content manager may manage the content that is presented by a player based on the assigned per-segment content ratings to ensure that suitable content is presented in accordance with the viewing audience's preference.

In certain embodiments, the content rating information may be embedded within the content of an individual work, such as within packet headers, tags, cues, as metadata, or other information included within an encoding or content delivery protocol employed for the work. In other embodiments, the content rating information may not be embedded within the content itself, but may nevertheless be associated with the content of the work (e.g., in a separate file, separate relational database, etc.), which may accompany the work (e.g., may be delivered to a player and/or content manager along with the work) to indicate the respective content rating information for each segment.

The content rating information for each segment may be based on any criteria that indicates the suitability of the content for certain audiences. The rating may be based on the suitability of the content contained within the corresponding segment for an audience based on the age, gender, geographic location, religion, and/or other characteristics of the audience. The rating may further be based on the graphic nature, violent nature, sexual nature, language used, and/or other potentially offensive, explicit, disturbing, or other characterization of the content. In one embodiment, the MPAA ratings may be used for movies. Instead or in addition to the MPAA ratings (or other rating system that may be employed), further content ratings may be employed which may designate ratings for content suitability on a per-religion basis. For instance, a rating of "OC" or "OM" to designate portions of the content that may be offensive to Christians ("OC") or to Muslims ("OM"), wherein with knowledge of the viewing audience characteristics (e.g., input of user preference settings to a content manager for defining an audience profile), the content manager device may manage the playback of the work appropriately for such audience. As another example, further content ratings may be employed which may designate ratings for content suitability on a per geographic region basis. For instance, a rating of "O-US" or "O-FR" to designate portions of the content that may be offensive in the United States ("O-US") or in France ("O-FR"), wherein with knowledge of the viewing audience characteristics (e.g., input of user preference settings to the content manager for defining an audience profile), the content manager device may manage the playback of the work appropriately for such audience.

Additionally, in some embodiments a plurality of content rating tags may be associated with each segment. For instance, a rating of "O-US" and "PG-13" may be assigned to a single segment of content to designate that such segment contains content that may be offensive in the United States ("O-US") for persons under the age of 13, while a rating of "O-FR" and "R" may be assigned to a segment to designate that such segment contains content that may be offensive in France ("O-FR") for persons under the age of 17. Any number of such ratings may be so defined based on any characteristics/preferences of a potential viewing audience, in accordance with embodiments of the present invention.

Additionally, there may be different/separate ratings for different types of content contained in a work, such as independent ratings for audio and video portions of the audiovisual work. In this way, the video portion of the audiovisual work may have a different rating from the corresponding audio portion that plays at the same time as the video portion. Thus, for instance, in certain embodiments a given segment of an audiovisual work may have a first content rating tag indicating the content rating for its visual portion (video) and a second content rating tag indicating the content rating for its audio portion. As such, the video and audio portions may be managed independently by the content manager. For instance, if the video portion has a rating that does not exceed the preference of the viewing audience but the corresponding audio portion does have a rating that exceeds the preference of the viewing audience (e.g., the video is "clean" but the language used in the corresponding audio portion of the movie is offensive), then only the audio portion may be skipped (e.g., silenced) or replaced (e.g., with different language). Alternatively, if either of the video or corresponding audio portions have a rating that exceeds the preference of the viewing audience, then the entire corresponding segment of both audio and video may be either skipped or replaced with an alternative segment.

A content manager device may receive user preferences, and may thus manage the delivery and/or playback of the various content segments of a work based on the user preferences and the respective content ratings assigned to each segment. In some instances, for segment(s) having a content rating tag indicating that its content is unacceptable to the user, the content manager may cause the player to skip playback of such segment(s). In some instances, alternative segments may be provided within the work, which may have different content ratings. Thus, if the content manager detects that a segment is unsuitable for playback to a given audience, it may determine whether a suitable alternative segment exists (based on the user's preferences and the alternative segments' respective content ratings). If an alternative segment that is suitable is provided, then the content manager may cause the player to replace the offending, unsuitable segment with a corresponding alternative (e.g., "cleaner") segment in its output during its playback of the work. Thus, in certain embodiments, the content manager may cause the player to skip the playback of certain segments in the work that exceed the user's minimal settings, or the content manager may cause the player to replace the offending segment's content with alternative content—e.g., a "cleaner" version of the content or an advertisement, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The word "exemplary" is used herein to mean "serving as an example, instance, or illustration." Any embodiment described herein as "exemplary" is not necessarily to be construed as preferred or advantageous over other embodiments.

Figure 1:
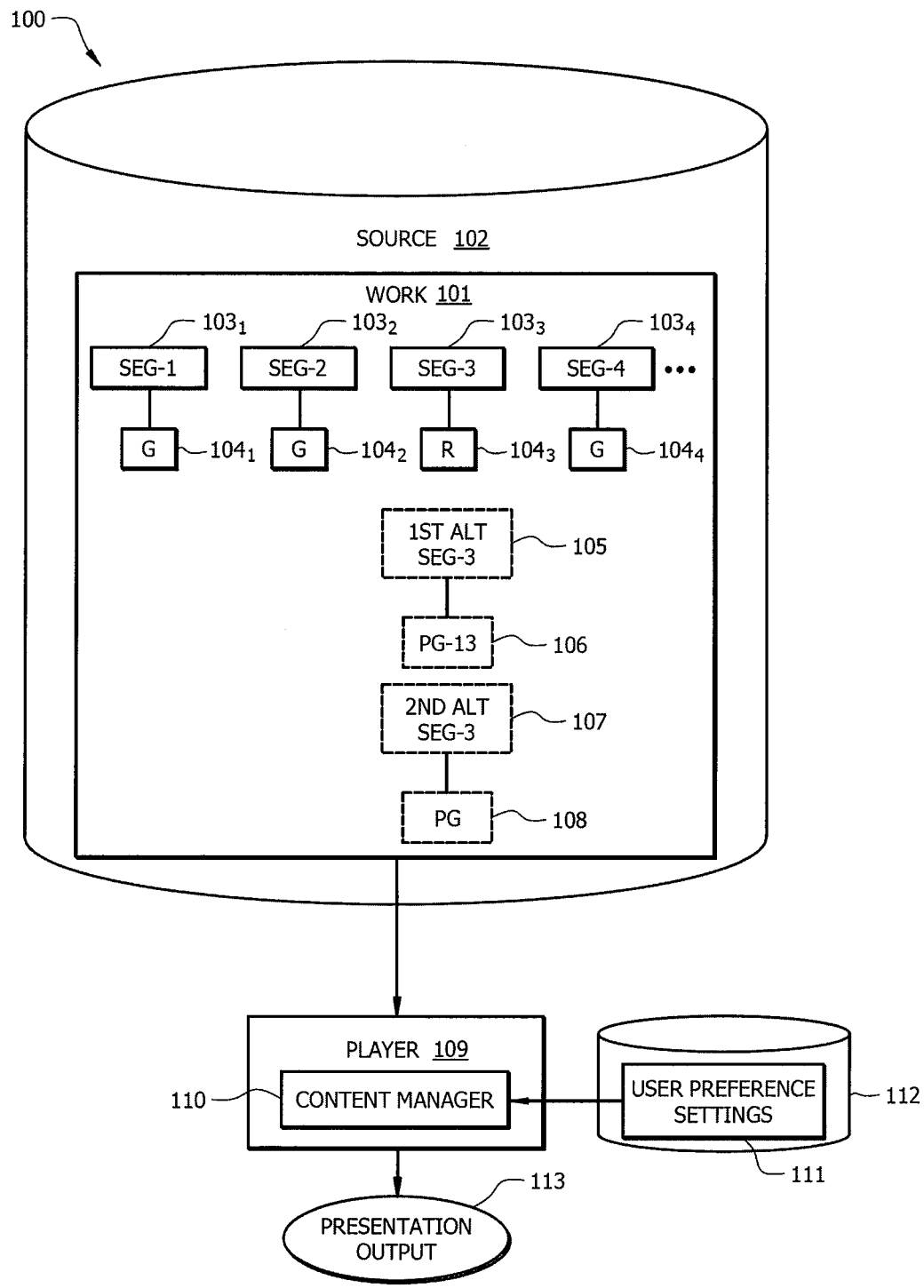
FIG. 1 shows an exemplary system according to one embodiment of the present invention.

FIG. 1 shows an exemplary system 100 according to one embodiment of the present invention. System 100 includes an individual work 101 that is stored to a data storage device 102, which may also be referred to as a "source" device. Examples of such a data storage or "source" device may have a hard disk, hard drive media, optical media (e.g., DVD, CD, etc.), RAM, ROM, EPROM, EEPROM, tape media, cartridge media, flash memory device, memory stick, magnetic memory device, and/or the like. The source 102 may, in some embodiments be a server computer or other data storage device that resides remotely from a player 109, where the work 101 may be communicated via a communication network (e.g., the Internet, cable, satellite, or other television network, etc.). In other embodiments, the source 102 may reside on or be locally coupled to player 109, such as where work 101 is downloaded via a communication network to local data storage of player 109 (e.g., as in a situation where player 109 is a media player executing on a computer device that receives work 101 downloaded from iTunes or other source, or where an optical media (e.g., CD, DVD, etc.), flash memory, or other data storage device containing work 101 is coupled to player 109 (e.g., as in a situation where player 109 is a DVD player that receives a DVD containing work 101 thereon), as examples.

In the example of FIG. 1, work 101 is described as being an audiovisual work (e.g., a movie). The audiovisual work 101 may be stored as digital data to source 102 in a suitable digital format, such as a MPEG-based format for example. The audiovisual work 101 may comprise a number of frames of content, which may be delivered to a player 109 in data packets, for example. Of course, while work 101 is described in this example as being an audiovisual work, the work may instead be another type of work, such as an audio work, textual work, or pictorial work, as examples. In accordance with certain embodiments, the work 101 is a non-programmatic work, as discussed further herein.

In this example, work 101 has its content divided into a plurality of segments, shown as segments $103_1$, $103_2$, $103_3$, and $103_4$. While four segments are shown in this example, it should be recognized that any number of two or more content segments may be defined for a given individual work in accordance with embodiments of the present invention.

The segments may be defined within a work in any of a number of suitable ways. As one example, the creator/author or producer of work 101 may designate the segments. In other embodiments, another party may analyze work 101 and define the various segments therein. As discussed further herein, such analysis may be performed in advance of runtime of work 101, thereby predefining the segments and their respective content ratings in advance of the work being requested for acquisition (e.g., download) or playback by player 109, or in certain embodiments the analysis for defining the segments and/or respective content ratings may be performed dynamically (e.g., in response to player 109 requesting acquisition, e.g., download, or playback of the work 101).

The segments $103_1$-$103_4$ may be of equal size/length, or they may vary. For instance, in one embodiment, the segments have a fixed, predefined size, such as X number (e.g., 500) of frames of work 101. In this way, the length of the segments may be relatively fixed/static, and a respective content rating is assigned to each segment, as discussed further below. In another embodiment, segment lengths may vary based on assignment of content rating tags. For instance, a first segment having a rating of "G" may have a length stretching to a subsequent portion of the content where the rating changes from "G" (e.g., to "R"). That is, a first segment may begin with a cue or tag indicating that the segment's content has a "G" rating, and may continue to a point in the content of work 101 where a cue or tag indicates that the content changes from "G" to a different rating, such as "R". Such a cue or tag indicating the content ratings may be embedded within the content itself (e.g., as a tag, header, etc.) or it may reside external to the content itself but accompany the content and identify locations (e.g., running-time points or other reference points within the content) where the content ratings change. A second segment having the changed rating (e.g., "R") may then begin and stretch to a subsequent portion of the content where the rating changes again (e.g., back to "G") at which point a third segment having the new rating begins, and so on.

In accordance with the exemplary embodiment of FIG. 1, each segment $103_1$-$103_4$ is assigned a respective content rating, and information indicating the respective content rating (e.g., a respective content rating tag) is associated with each segment. For instance, in the example of FIG. 1, content rating tags $104_1$, $104_2$, $104_3$, and $104_4$ are associated with segments $103_1$, $103_2$, $103_3$, and $103_4$, respectively, to indicate the content rating of the corresponding segment. In this example, the MPAA content rating scheme is used as an example, where content rating tag $104_1$ indicates that the content contained in segment $103_1$ is rated "G," content rating tag $104_2$ indicates that the content contained in segment $103_2$ is likewise rated "G," content rating tag $104_3$ indicates that the content contained in segment $103_3$ is rated "R," and content rating tag $104_4$ indicates that the content contained in segment $103_4$ is rated "G."

It should be recognized that this enables an independent content rating to be assigned on a per-segment basis of work 101, as opposed to be restricted merely to a content rating for the overall work 101. For instance, as can be seen in the example of FIG. 1, only segment $103_3$ is not "G" rated, and thus while the overall work 101 may have a content rating of "R" (based on the content contained in segment $103_3$), this embodiment enables identification of content ratings at a finer granularity than the overall work 101. Accordingly, as discussed further below, an audience desiring to view content less explicit than "R" (e.g., an audience desiring "G," "PG," or "PG-13," for instance) may nevertheless watch the movie 101 having an overall rating of "R," and a content manager 109 may manage the content that is presented in output 113 based on the assigned per-segment content ratings $104_1$-$104_4$ to ensure that suitable content is presented in accordance with the viewing audience's preference.

In certain embodiments, the content rating information (e.g., tags) $104_1$-$104_4$ may be embedded with the content of work 101, such as within packet headers, tags, cues, as metadata, or other information included within an encoding or content delivery protocol employed for work 101. In other embodiments, the content rating information may not be embedded within the content itself, but may nevertheless be associated with the content of work 101 (e.g., in a separate file, separate relational database, etc.), which may accompany work 101 (e.g., may be delivered to player 109 and/or content manager 110 with work 101) to indicate the respective content rating information for each segment.

The content rating information for each segment may be based on any criteria that indicates the suitability of the content for certain audiences. The rating may be based on the suitability of the content contained within the corresponding segment for an audience based on the age, gender, geographic location, religion, and/or other characteristics of the audience. The rating may further be based on the graphic nature, violent nature, sexual nature, language used, and/or other potentially offensive, explicit, disturbing, or other characterization of the content. In one embodiment, the MPAA ratings may be used for movies. Instead or in addition to the MPAA ratings (or other rating system that may be employed), further content ratings may be employed which may designate ratings for content suitability on a per-religion basis. For instance, a rating of "OC" or "OM" to designate portions of the content that may be offensive to Christians ("OC") or to Muslims ("OM"), wherein with knowledge of the viewing audience characteristics (e.g., input of user preference settings 111 to content manager 110 defining an audience profile), content manager device 110 may manage the playback of the work 101 appropriately for such audience. As another example, further content ratings may be employed which may designate ratings for content suitability on a per geographic region basis. For instance, a rating of "O-US" or "O-FR" to designate portions of the content that may be offensive in the United States ("O-US") or in France ("O-FR"), wherein with knowledge of the viewing audience characteristics (e.g., input of user preference settings 111 to content manager 110 defining an audience profile), the content manager device 110 may manage the playback of the work 101 appropriately for such audience.

Additionally, while a single content rating tag is shown for each segment in the example of FIG. 1, in some embodiments a plurality of content rating tags may be associated with each segment. For instance, a rating of "O-US" and "PG-13" may be assigned to a single segment of content to designate that such segment contains content that may be offensive in the United States ("O-US") for persons under the age of 13, while a rating of "O-FR" and "R" may be assigned to a segment to designate that such segment contains content that may be offensive in France ("O-FR") for persons under the age of 17. Any number of such ratings may be so defined based on any characteristics/preferences of a potential viewing audience, in accordance with embodiments of the present invention.

Additionally, there may be different/separate ratings for different types of content contained in work 101, such as independent ratings for audio and video portions of the audiovisual work. In this way, the video portion of the audiovisual work may have a different rating from the corresponding audio portion that plays at the same time as the video portion. Thus, for instance, while segment $103_1$ is shown in FIG. 1 as being assigned a content rating tag $104_1$ (indicating a "G" content rating), in certain embodiments segment $103_1$ may have a first content rating tag indicating the content rating for its visual portion (video) and a second content rating tag indicating the content rating for its audio portion. As such, the video and audio portions may be managed independently by content manager 110. For instance, if the video portion has a rating that does not exceed the preference of the viewing audience but the corresponding audio portion does have a rating that exceeds the preference of the viewing audience (e.g., the video is "clean" but the language used in the corresponding audio portion of the movie is offensive), then only the audio portion may be skipped (e.g., silenced) or replaced (e.g., with different language). Alternatively, if either of the video or corresponding audio portions have a rating that exceeds the preference of the viewing audience, then the entire corresponding segment of both audio and video may be either skipped or replaced with an alternative segment. In other embodiments, the content rating tag $104_1$ may provide an overall content rating for both the visual and audio portion of its respective segment $103_1$, such as illustrated in the example of FIG. 1.

Where independent tags are used for different portions of a work, such as for video and audio, the segments for each of the different portions (e.g., audio and video of an audiovisual work) may be of the same size/length or they may be different.

As shown in the example of FIG. 1, the work 101 may be received for playback by player 109. As used herein, a "player" refers generally to any device for playback of a work. The "playback" of a work refers generally to output 113 of the content of such work, which may be output of an audio work, an audiovisual work, a textual work, or a pictorial work, as examples. For instance, an e-book Reader may be a player that is employed for "playback" of an e-book. Such a "playback" of an e-book typically presents portions of the book one screen (e.g., one page) at a time, and responds to user input to advance to the next screen presenting the next sequential portion of the e-book. A media player (e.g., MP3, MPEG player, etc.) may be a player that is employed for "playback" of an audio work (e.g., song recording) or audiovisual work (e.g., movie), for example. Computers, set-top boxes, CD players, DVD players, receivers of various types for receiving streaming content (e.g., broadcast or otherwise), or other types of player devices may be employed for playback of a work as will be readily appreciated by those of ordinary skill in the art.

In accordance with certain embodiments, a content manager 110 is implemented to manage the delivery and/or playback of content of work 101 based on the per segment content rating tags $104_1$-$104_4$. The content manager 110 may be implemented as an integrated part of player 109 or it may be a separate, intermediate device/component that is communicatively coupled with player 109. For instance, in one exemplary embodiment, content manager 109 is implemented within player 109 (e.g., as software code stored to a computer-readable medium and executing on a processor of player 109) to manage playback of content of work 101 that is received by player 109. In another exemplary embodiment, content manager 109 is implemented at a server device or at an intermediate network device (e.g., a router, etc.) to manage delivery of content of work 101 to player 109. For instance, work 101 may be hosted on a server for download to a recipient's player 109, such as with the download of a purchased or rented movie (e.g., via on-demand internet streaming video via Netflix or other provider). Content manager 109 may reside on such server or on an intermediate network device to manage delivery of work 101 to player 109 in accordance with user preference settings 111. For instance, as discussed further herein content manager 110 may instruct player 109 to skip certain segments or to replace certain segments with alternative segments in its output 113 during its playback of work 101.

User preference settings 111 may be input by a user to content manager 110 and/or to another interface device (e.g., the user preference settings 111 may, in certain embodiments, be input by a user to a web page hosted on a web server that is accessible by a user's computer). User preference settings 111 may be stored as digital data to a data storage device 112, which may be part of player 109, part of source 102, or any other data storage device of the general nature as described above for source 102. User preference settings 111 may specify various characteristics of a user and/or the user's viewing audience, such as age(s), gender(s), geographic location, religious views, etc., and/or may specify a desired level of content rating that is to be permitted (e.g., "PG" may be specified, where anything more restrictive than PG, such as PG-13 or R, is designated as not permitted or "blocked"). Of course, the user may change his/her preference settings as desired, such as if/when a viewing audience changes (e.g., if a user's grandchild is visiting him/her, the user may change his preference settings 111 to be more restrictive; or if an adult user is planning to view a work 101 with his/her parents or grandparents, he may change his preference settings 111 to be more restrictive to avoid a potentially embarrassing or uncomfortable situation). As discussed further herein, the content manager 110 may manage playback of work 101 based on the content ratings, such as "G," "R," etc., that are assigned on a per-segment basis of work 101, and where user characteristic information like religious views, etc. are provided in user preference settings 111, content manager 110 may also, in certain embodiments, manage playback of work 101 based on further content ratings that designate segments that may be offensive/explicit based on the user's religious views and/or other characteristics.

Thus, in certain embodiments, content manager 110 may receive input of a user's preference settings 111, which define the preference of the user regarding the content ratings that are acceptable to be played back. The user may input information specifying an acceptable level of content rating (e.g., "G"), where content ratings above the acceptable level (e.g., more restrictive) are to be skipped or replaced with acceptable content. The content manager 110 may thus manage the playback of work 101 based on the user's preference settings (or "profile") 111 and the content rating tags assigned to the various segments of work 101.

In some instances, segment(s) having a content rating tag indicating that its content is unacceptable to the user (based on the user's preferences 111), the content manager 110 may cause player 109 to skip such segment(s). In some instances, alternative segments may be provided within work 101, which may have different content ratings. For instance, in the example illustrated in FIG. 1, a first alternative segment for the R-rated segment $103_3$ is provided as alternative segment 105, which is assigned a corresponding content rating tag 106 indicating that its content is rated "PG-13." Additionally, a second alternative segment for the R-rated segment $103_3$ is provided as alternative segment 107, which is assigned a corresponding content rating tag 108 indicating that its content is rated "PG." Thus, if content manager 110 detects that segment $103_3$ is unsuitable for playback, it may determine whether either of the alternative segments 105 and 107 are suitable (based on the user's preferences and the alternative segments' respective content ratings). If one of the alternative segments 105 and 107 is determined as being suitable for playback, then content manager 110 may cause player 109 to replace segment $103_3$ with the appropriate one of the alternative segments in its output 113 during its playback of the work 101. Thus, in certain embodiments, the content manager 110 may cause player 109 to skip the playback of certain segments in work 101 that exceed the user's minimal settings (as defined in preference settings 111), or the content manager 110 may cause player 109 to replace the offending segment's content with alternative content—e.g., a "cleaner" version of the content or an advertisement, etc.

Figure 2:
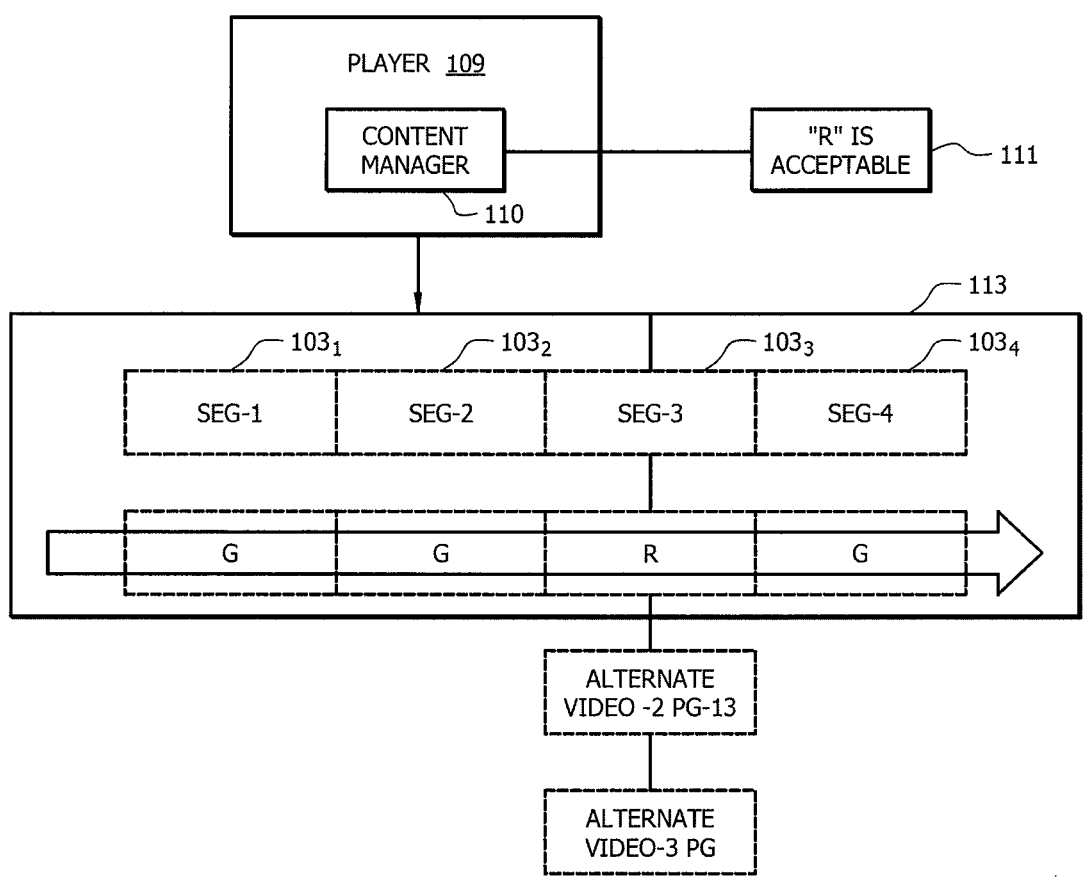
FIG. 2 shows an example of managing playback of the work of FIG. 1 where the user's preference settings indicate that a rating of "R" is acceptable for playback.

Turning to FIG. 2, an example is shown where the user's preference settings 111 indicate that a rating of "R" is acceptable for playback during the playback of work 101 by player 109. Thus, content manager 110 manages the playback of player 109 to permit it to output all of segments $103_1$-$103_4$ in output 113, as all of such segments have a rating of "R" or lower.

Figure 3:
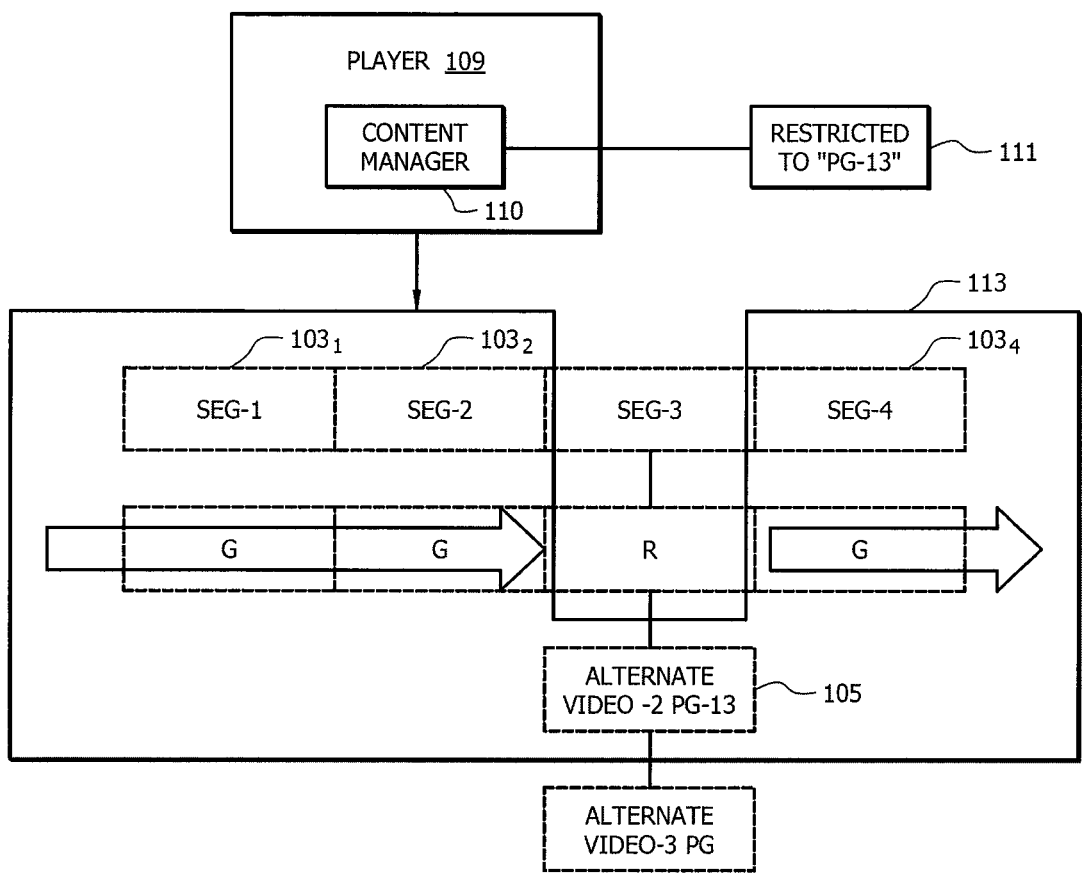
FIG. 3 shows an example of managing playback of the work of FIG. 1 where the user's preference settings indicate that suitable content is restricted to that having no greater than a rating of "PG-13;"

FIG. 3 shows an example where the user's preference settings 111 instead indicate suitable content is restricted to that having no greater than a rating of "PG-13" during the playback of work 101 by player 109. Thus, in managing the playback of work 101, content manager 110 detects that segment $103_3$ fails to meet the user's criteria. That is, segment $103_3$ has a corresponding content rating tag indicating that its content is rated "R", which exceeds the user's PG-13 preference setting. However, content manager 110 determines that there is an alternative segment 105 having a corresponding content rating tag that indicates its content is suitable (i.e., PG-13), and thus content manager 110 manages the playback of player 109 to permit it to output segments $103_1$, $103_2$, and then replace segment $103_3$ with the alternative segment 105, and then output segment $103_4$ in output 113, so that all of the output segments have a rating of "PG-13" or lower.

Figure 4:
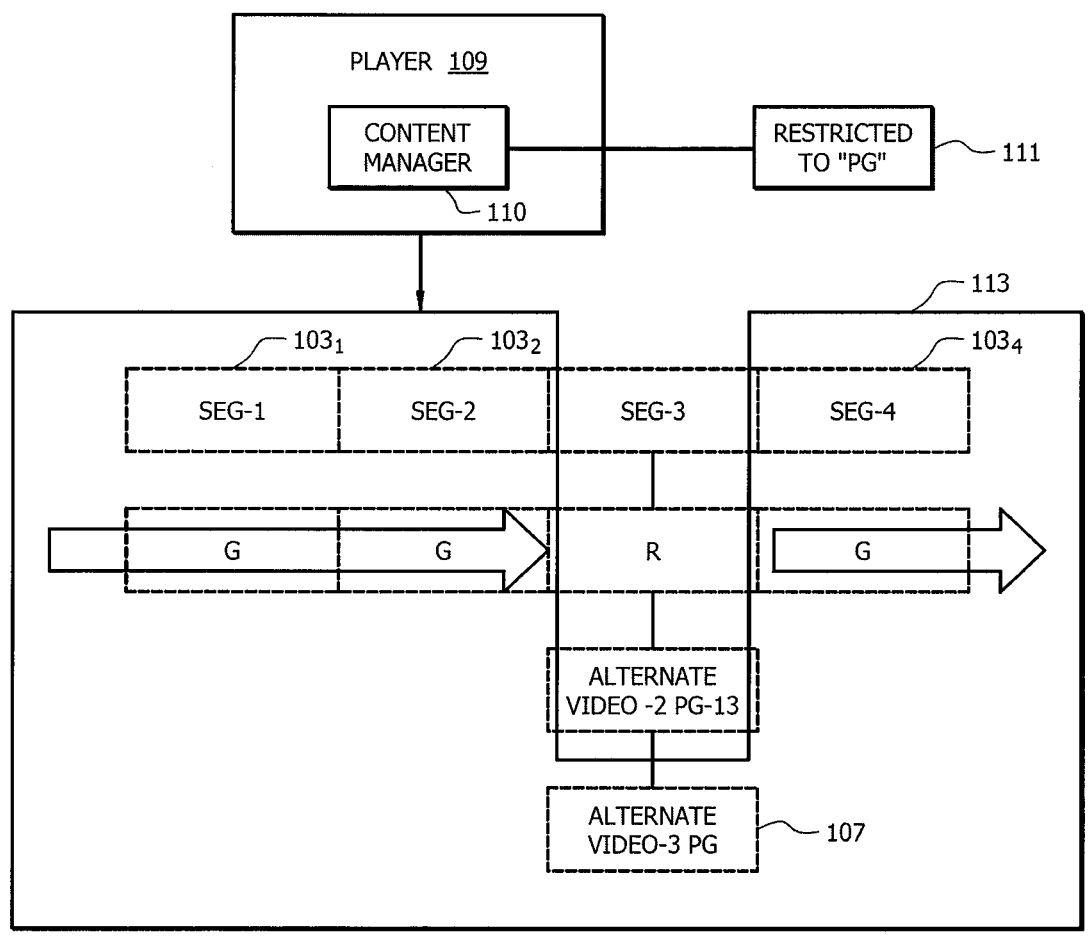
FIG. 4 shows another example of managing playback of the work of FIG. 1 where the user's preference settings indicate that suitable content is restricted to that having no greater than a rating of "PG;"

FIG. 4 shows another example where the user's preference settings 111 instead indicate suitable content is restricted to that having no greater than a rating of "PG" during the playback of work 101 by player 109. Thus, in managing the playback of work 101, content manager 110 detects that segment $103_3$ fails to meet the user's criteria. That is, segment $103_3$ has a corresponding content rating tag indicating that its content is rated "R", which exceeds the user's PG preference setting. However, content manager 110 determines that there is an alternative segment 107 having a corresponding content rating tag that indicates its content is suitable (i.e., PG), and thus content manager 110 manages the playback of player 109 to permit it to output segments $103_1$, $103_2$, and then replace segment $103_3$ with the alternative segment 107, and then output segment $103_4$ in output 113, so that all of the output segments have a rating of "PG" or lower.

Figure 5:
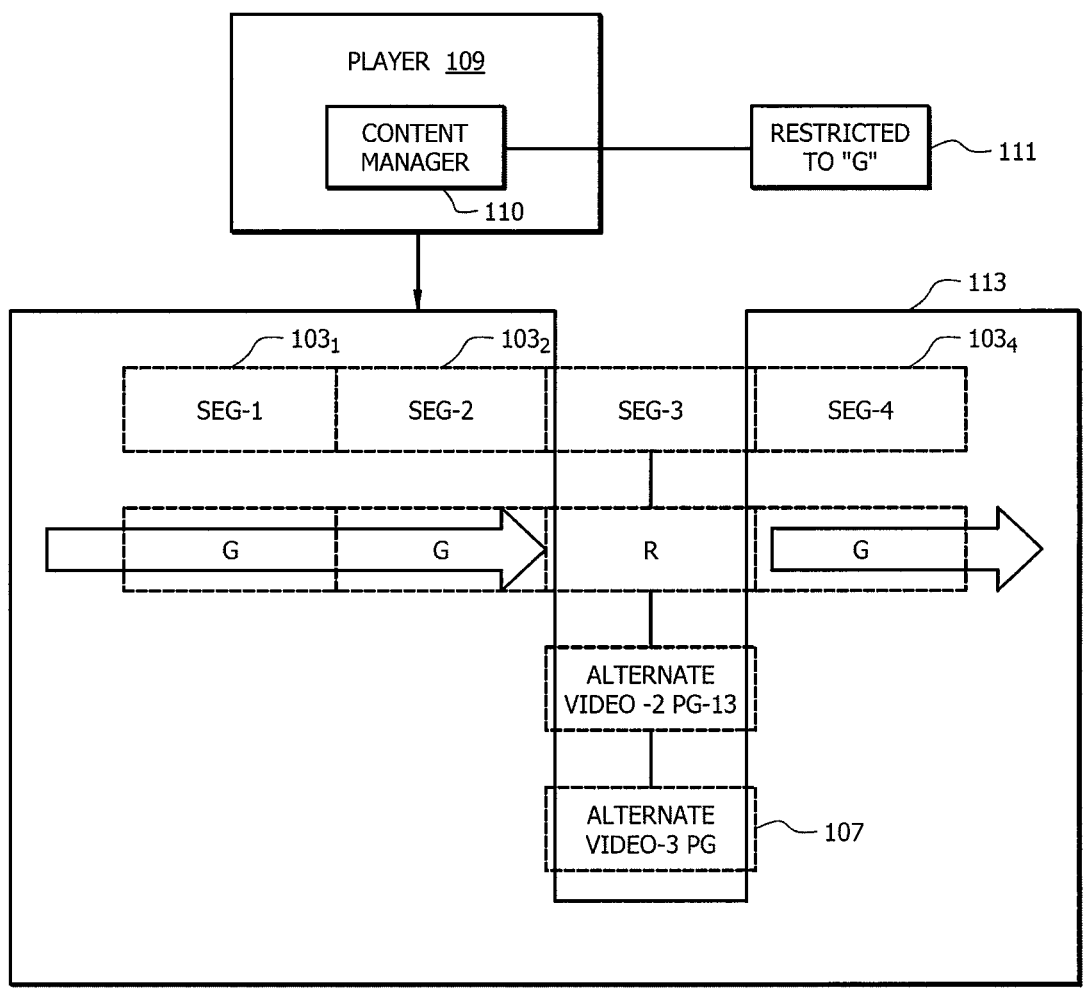
FIG. 5 shows yet another example of managing playback of the work of FIG. 1 where the user's preference settings indicate that suitable content is restricted to that having no greater than a rating of "G;"

FIG. 5 shows another example where the user's preference settings 111 instead indicate suitable content is restricted to that having no greater than a rating of "G" during the playback of work 101 by player 109. Thus, in managing the playback of work 101, content manager 110 detects that segment $103_3$ fails to meet the user's criteria. That is, segment $103_3$ has a corresponding content rating tag indicating that its content is rated "R", which exceeds the user's G preference setting. In this instance, content manager 110 determines that there is no alternative segment having a corresponding content rating tag that meets the user's criteria of no greater than "G," and thus content manager 110 manages the playback of player 109 to permit it to output segments $103_1$, $103_2$, and then skip segment $103_3$, and then output segment $103_4$ in output 113, so that all of the output segments have a rating of "G" or lower. Of course, if an alternative segment were available that satisfied the user's criteria such alternative segment could be used in place of the offending segment $103_3$, as in the above examples of FIGS. 3-4.

In certain embodiments, the per-segment content rating information is determined in advance of the delivery and/or playback of work 101. For instance, a human analyst may manually insert the content rating tags $104_1$-$104_4$ into the work 101 before such work 101 is made available for distribution/delivery to consumers. In other embodiments, the content rating information may be determined dynamically, e.g., at delivery and/or playback time of a work. In either case, a content rating device such as described in connection with FIG. 6 below may be employed to aid in rating content on a per-segment basis.

Figure 6:
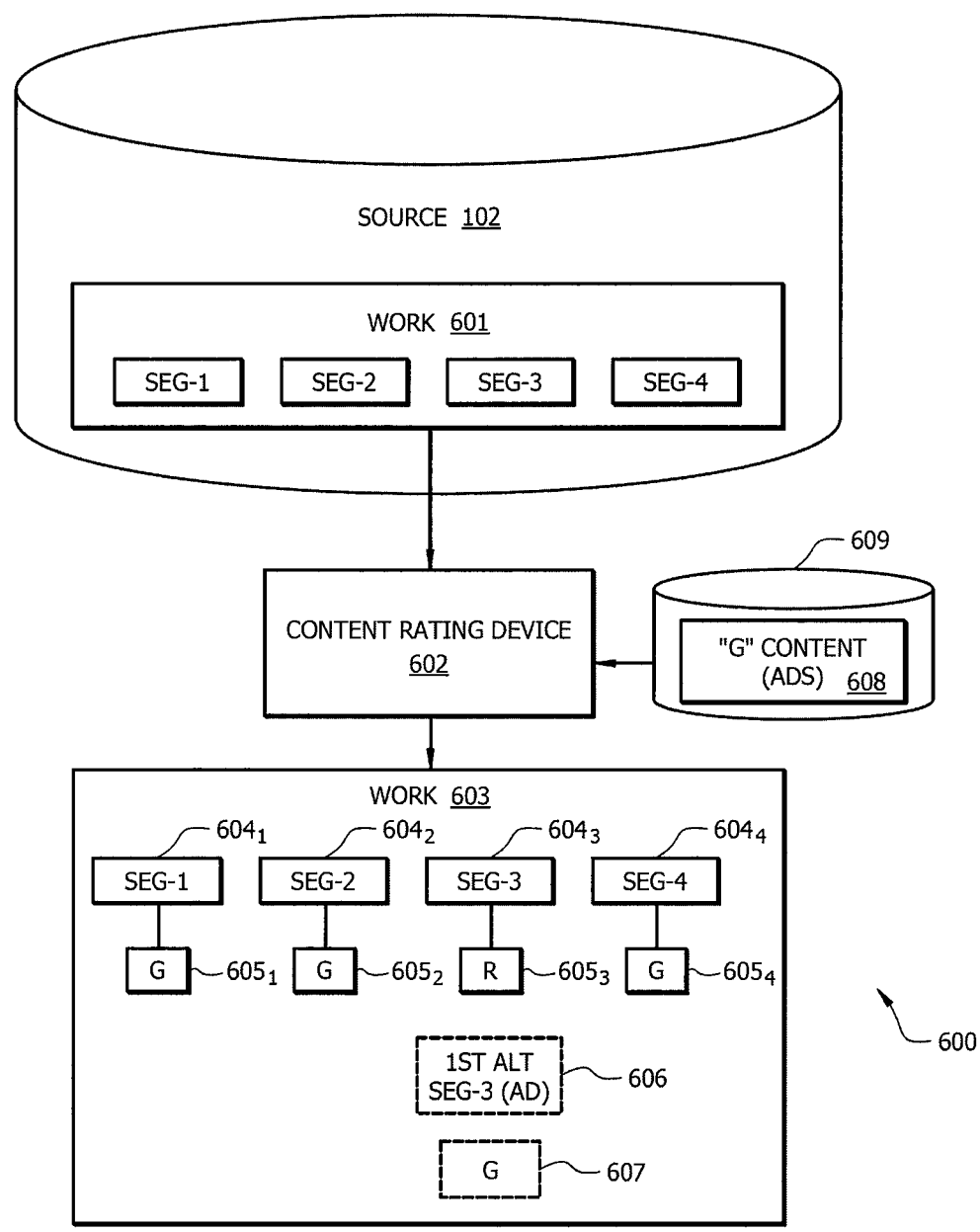
FIG. 6 shows an exemplary system in accordance with one embodiment of the present invention for rating content of a work on a per-segment basis.

FIG. 6 shows an exemplary system 600 in accordance with one embodiment of the present invention for rating content of a work on a per-segment basis. In this example, a work (e.g., a movie) 601 is stored to source 102. In this case, work 601 does not have content rating tags pre-assigned on a per-segment basis. Content rating device 602 receives work 601 and analyzes the content of such work 601 to define its segments and/or assign content ratings to each segment based on its respective content. In certain embodiments content rating device 602 may be implemented to perform such an analysis autonomously, with no interaction required with a user for assigning the content ratings. For instance, content rating device 602 may analyze subtitle text included in the work to identify foul, violent, or otherwise explicit language. In certain embodiments, content rating device 602 may employ speech-to-text conversion technology to convert the speech of work 601 to text, and then analyze the converted text to identify foul, violent, or otherwise explicit language. As still another example, content ratings device 602 may employ audio analysis techniques to detect explosions and/or other sounds that may be indicative of graphic, violent, or otherwise explicit material. As yet another example, content rating device 602 may employ analysis of the video output portions of the work 101 to detect, for example, an amount of skin tone on the screen and/or other information about the video content in order to detect portions of the content that may contain sexual or otherwise explicit material.

Various technologies for speech to text conversion, text analysis, audio analysis, and video/pictorial analysis are well-known and continue to be further improved/developed, and any such technologies may be leveraged by content rating device 602 in order for it to analyze work 601 and assign content ratings on a segment-by-segment basis, thereby generating work 603 having segments $604_1$-$604_4$ assigned respective content ratings $605_1$-$605_4$. In certain embodiments, content rating device 602 may also insert alternative content segments into work 603, which may be used as an alternative to presenting segments containing highly-restricted content (e.g., "R" rated content) in some instances (e.g., in a manner as discussed above with alternative segments 105 and 107 for work 101). For instance, general audience (or "G") content, like advertisements, etc., 608 may be stored to data storage device 609, which may be communicatively accessible to content rating device 602. Thus, in certain embodiments when content rating device 602 identifies a segment as having a highly-restrictive rating, it can add some of such G content 608 as an alternative, less-restrictive segment of content. For instance, in the illustrated example of FIG. 6, content rating device adds an alternative content segment (e.g., advertisement) 606 having a G-rated content rating tag 607, as an alternative for the segment $604_3$ having the R-rated content rating tag $605_3$. Thus, the resulting generated work 603 that has its segments individually assigned respective content rating tags may be delivered to a player 109, wherein a content manager 110 may manage its playback in a manner similar to that discussed above for work 101 in FIGS. 1-5.

Certain embodiments of the present invention assign content ratings to each of a plurality of segments of an individual, non-programmatic work based on the content contained in the respective segment. Further, the individual non-programmatic work and an identification of the content ratings assigned to each of the plurality of segments may be stored to a data storage device. Accordingly, the work and the content ratings may be read by a content manager device to manage playback of the work, based at least in part on the respective content ratings of the segments. For instance, a content manager device may be configured to cause the playback to skip certain ones of the segments that have a content rating at or above a certain restrictive level. As another example, in some instances the content manager device may be configured to cause the playback to replace certain ones of the segments that have a content rating at or above a certain restrictive level with alternative segments that have a content rating below the certain restrictive level.

As discussed previously herein, non-programmatic works, like movies, song recordings, e-books, etc., have traditionally provided only an overall content rating for the individual work as a whole, rather than rating content thereof on a per-segment basis. While some programmatic works, like video games, permit users some flexibility in setting certain features, like the difficulty level of the game, etc., non-programmatic works are different in their nature. For instance, non-programmatic works are not coded instructions that are executed by a processor to dynamically generate output content responsive to continuous interaction with a user, e.g., in playing a video game. Instead, non-programmatic works generally have predefined, fixed content, like segments of a movie, song recording, e-book, etc., that are to be presented. While certain embodiments of the present invention may be readily applied for programmatic works, like video games, they have particular advantage in application to non-programmatic works, as they are not traditionally composed substantially of instructions to be interpreted for controlling dynamically generated output.

Figure 7:
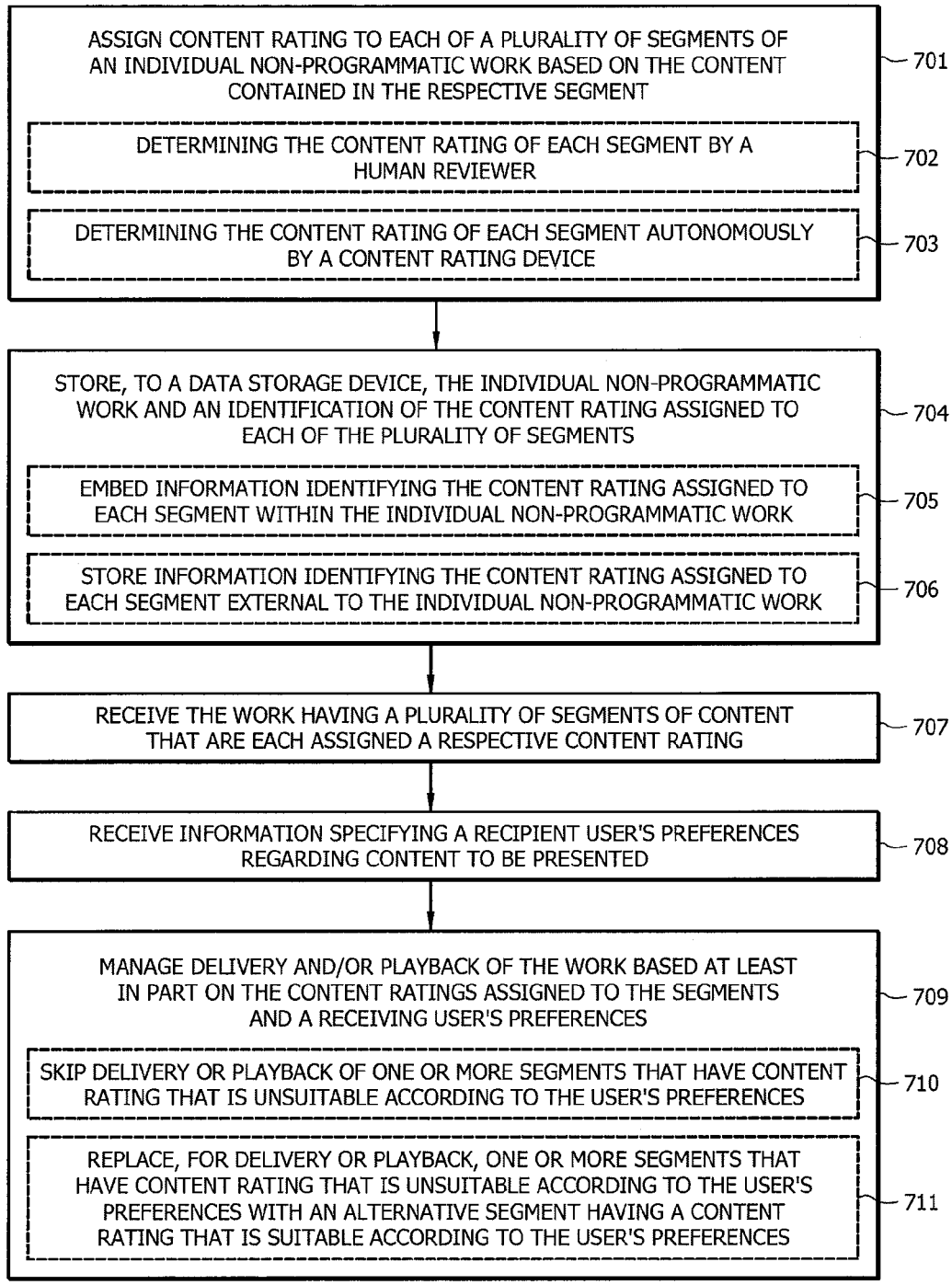
FIG. 7 shows an exemplary operational flow diagram according to one embodiment of the present invention.

Turning now to FIG. 7, an operational flow diagram for one embodiment of the present invention is shown. In operational block 701, a respective content rating is assigned to each of a plurality of segments of an individual non-programmatic work based on the content contained in the respective segment. As shown in optional sub-block 702, the content rating for each segment may be determined by a human reviewer in certain embodiments, whereas in optional sub-block 703 the content rating for each segment may be determined autonomously by a content rating device (as discussed above with FIG. 6).

In block 704 the individual non-programmatic work and information identifying the content rating assigned to each of the plurality of segments (e.g., content rating tags) are stored to a data storage device. As shown in optional sub-block 705, in one embodiment the content rating information is embedded within the individual work, such as an embedded tag, cue, header, etc. As shown in optional sub-block 706, in other embodiments the content rating information may be stored external to the individual work (e.g., to an external file or relational database, etc.), where the externally-stored information may accompany the individual work such that content manager 110 can use the content rating information in the manner described further herein for managing delivery and/or playback of the work.

In block 707 the work having a plurality of segments of content that are each assigned a respective content rating is received, e.g., by a content manager and/or a player device. In block 708, information specifying a recipient user's preferences (e.g., preference settings 111) is received, e.g., by a content manager 110.

In block 709, a content manager 110 manages delivery and/or playback of the work based at least in part on the content ratings assigned to the segments and a receiving user's preferences (e.g., preference settings 111). As shown in optional sub-block 710, in certain embodiments, content manager 110 may manage delivery and/or playback of the content by skipping delivery and/or playback of one or more segments that have content rating that is unsuitable according to the user's preferences. For instance, the content manager 110 may cause a player 109 to skip playback of certain unsuitable segments. As shown in optional sub-block 711, in certain embodiments, content manager 110 may manage delivery and/or playback of the content by replacing one or more of such unsuitable segments with an alternative segment having a content rating that is suitable according to the user's preferences.

While various examples are described above with reference to FIGS. 1-6 in which the work is described as being an audiovisual work (e.g., a movie), it should be recognized that the concepts described herein may likewise be applied to other types of individual works, particularly non-programmatic works, like song recordings or other audio works, e-books or other textual works, pictorial works, etc.

Many of the elements described herein, when implemented via computer-executable instructions, are in essence the software code defining the operations thereof. For instance, the above-described content manager 110, player 109, and content rating device 602 each may comprise computer-executable software code that is stored to a computer-readable medium and is executed by a processor-based computing device for performing the corresponding operations described herein. Further, the various operations described herein, such as those operations described with reference to the exemplary flow of FIG. 7, as well as other operations described herein may be performed by computer-executable software code stored to a computer-readable medium and executing on a processor-based computing device. The executable instructions or software code may be obtained, for example, from a computer-readable medium or "storage device" (e.g., a hard drive media, optical media, EPROM, EEPROM, tape media, cartridge media, flash memory, ROM, memory stick, and/or the like). In certain embodiments, a CPU of a computing system or device may execute the various logical instructions according to embodiments of the present invention. It shall be appreciated that the present invention is not limited to the architecture of the computing system or device on which the various elements are implemented. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, as examples. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-programmatic content assignment method comprising:
    receiving, at a content manager device, an individual non-programmatic work;
    receiving, at the content manager device, information indicating a receiving audience's preference regarding suitability of content to be presented;
    assigning, by the content manager, a content rating to each of a plurality of segments of the individual non-programmatic work based on the content contained in the respective segments by performing an audio analysis of audio content of the plurality of segments and a video analysis of video content of the plurality of segments, including assigning independent ratings to audio and video portions of the individual non-programmatic work based on the audio analysis and the video analysis;
    storing, to a data storage device, the individual non-programmatic work and an identification of the content rating assigned to each of the plurality of segments; and
    managing, by the content manager device, at least one of delivery and playback of the individual non-programmatic work at the receiving audience based on the audio analysis and the video analysis performed on the plurality of segments and on the audience's preference;
    wherein assigning the content rating is performed during delivery of the individual non-programmatic work to the receiving audience.

2. The method of claim 1 wherein the individual non-programmatic work is in digital data form.

3. The method of claim 1 wherein the individual work is an audiovisual work.

4. The method of claim 3 wherein the individual work is a movie.

5. The method of claim 1 wherein the individual work is an audio work.

6. The method of claim 5 wherein the individual work is a song.

7. The method of claim 1 wherein the individual work is a textual work.

8. The method of claim 7 wherein the individual work is a book.

9. The method of claim 1 wherein said content rating of each segment indicates suitability of content contained in the respective segment for a particular audience.

10. The method of claim 1 wherein said content ratings indicate a degree of offensiveness or explicit nature of content contained in the respective segment.

11. The method of claim 1 wherein assigning the content rating is performed while the content manager device receives the individual non-programmatic work.

12. The method of claim 1 wherein assigning the content rating is further performed while the content manager device manages playback of the individual non-programmatic work at the receiving audience.

13. The method of claim 12 wherein said managing further comprises:
    determining, by said content manager device, whether any of the segments have a content rating that is non-compliant with the audience's preference; and
    responsive to determining that one or more of the segments have a content rating that is non-compliant with the audience's preference, causing a player device to skip playback of said one or more segments.

14. The method of claim 12 wherein said managing further comprises:
    determining, by said content manager device, whether any of the segments have a content rating that is non-compliant with the audience's preference;
    responsive to determining that one of the segments has a content rating that is non-compliant with the audience's preference, determining by the content manager device whether an alternative content segment is available for playback that is compliant with the audience's preference; and
    when determined that an alternative content segment is available for playback that is compliant with the audiences preference, replacing the one segment with the alternative segment in the playback of said work by a player device.

15. The method of claim 14 where the method further comprises:
when determined that an alternative content segment is not available for playback that is compliant with the audiences preference, causing the player device to skip playback of said segment determined as having a content rating that is non-compliant with the audience's preference.

16. The method of claim 1 where the assigning comprises:
receiving the work into a content rating device; and
said content rating device autonomously analyzing content of said plurality of segments and determining a respective content rating to assign to each segment.

17. A non-programmatic content assignment system comprising:
a data storage device storing an individual non-programmatic work having a plurality of segments of content that are each independently assigned a respective content rating, wherein audio and video portions of the individual non-programmatic work have independent ratings assigned thereto, and segments for the audio and video portions are of different lengths;
said data storage device storing information identifying the respective content rating of each of the plurality of segments; and
a content manager device coupled to the data storage device that receives an individual non-programmatic work and information indicating a receiving audience's preference regarding suitability of content to be presented, wherein the content manager device:
assigns a content rating to each of a plurality of segments of the individual non-programmatic work based on the content contained in the respective segments by performing an audio analysis of audio content of the plurality of segments and a video analysis of video content of the plurality of segments, including assigning independent ratings to audio and video portions of the individual non-programmatic work based on the audio analysis and the video analysis; and
manages at least one of delivery and playback of the individual non-programmatic work at the receiving audience based on the audio analysis and the video analysis performed on the plurality of segments and on the audience's preference;
wherein assigning the content rating is performed during delivery of the individual non-programmatic work to the receiving audience.

18. The system of claim 17 wherein the content management device configured to receive said individual non-programmatic work and said information, and manage playback by a player device of the individual non-programmatic work based at least in part on the information.

19. The system of claim 18 where said content management device configured to receive information indicating a receiving audience's preference regarding suitability of content to be presented during playback of the work; and
wherein said content management device is configured to manage playback by the player device of the individual non-programmatic work based at least in part on the audience's preference.

20. Computer-executable software code stored to a non-transitory computer-readable medium that when executed by a processor causes the processor to perform a method comprising:
receiving an individual non-programmatic work;
receiving information indicating a receiving audience's preference regarding suitability of content to be presented;
assigning a content rating to each of a plurality of segments of the individual non-programmatic work based on the content contained in the respective segments by performing an audio analysis of audio content of the plurality of segments and a video analysis of video content of the plurality of segments, including assigning independent ratings to audio and video portions of the individual non-programmatic work based on the audio analysis and the video analysis;
storing, to a data storage device, the individual non-programmatic work and an identification of the content rating assigned to each of the plurality of segments; and
managing, by the content manager device, at least one of delivery and playback of the individual non-programmatic work at the receiving audience based on the audio analysis and the video analysis performed on the plurality of segments and on the audience's preference;
wherein assigning the content rating is performed during delivery of the individual non-programmatic work to the receiving audience.

21. The computer-executable software code of claim 20 wherein said managing playback further comprises managing playback of the individual non-programmatic work based at least in part on the audience's preference.

22. The computer-executable software code of claim 21 where the method further comprises:
wherein said managing playback comprises;
determining whether any of the segments have a content rating that is non-compliant with the audience's preference; and
responsive to determining that one or more of the segments have a content rating that is non-compliant with the audience's preference, skipping playback of said one or more segments.

23. The computer-executable software code of claim 21 where the method further comprises:
wherein said managing playback comprises;
determining whether any of the segments have a content rating that is non-compliant with the audience's preference,
responsive to determining that one of the segments has a content rating that is non-compliant with the audience's preference, determining whether an alternative content segment is available for playback that is compliant with the audience's preference; and
when determined that an alternative content segment is available for playback that is compliant with the audiences preference, replacing the one segment with the alternative segment in the playback of said work.

24. The computer-executable software code of claim 23 where the method further comprises:
when determined that an alternative content segment is not available for playback that is compliant with the audiences preference, skipping playback of said segment determined as having a content rating that is non-compliant with the audience's preference.

* * * * *